(12) United States Patent
Wang et al.

(10) Patent No.: US 12,476,457 B2
(45) Date of Patent: Nov. 18, 2025

(54) CIRCUIT FOR CONTROLLING CURRENT OF DIRECT CURRENT VOLTAGE SOURCE AND CONTROL METHOD

(71) Applicant: TSINGHUA UNIVERSITY, Beijing (CN)

(72) Inventors: Kui Wang, Beijing (CN); Zedong Zheng, Beijing (CN); Lie Xu, Beijing (CN); Yongdong Li, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 18/897,173

(22) Filed: Sep. 26, 2024

(65) Prior Publication Data

US 2025/0105623 A1   Mar. 27, 2025

(30) Foreign Application Priority Data

Sep. 26, 2023   (CN) .......................... 202311255195.X
Jul. 18, 2024   (CN) .......................... 202410969699.6

(51) Int. Cl.
*H02J 1/10*   (2006.01)
*H02J 3/38*   (2006.01)
*H02J 7/00*   (2006.01)

(52) U.S. Cl.
CPC .............. *H02J 1/102* (2013.01); *H02J 3/381* (2013.01); *H02J 7/0024* (2013.01); *H02J 2207/20* (2020.01); *H02J 2300/26* (2020.01)

(58) Field of Classification Search
CPC ...... H02J 1/10; H02J 1/102; H02J 3/38; H02J 3/381; H02J 7/00; H02J 7/0024; H02J 2207/20; H02J 2300/26
See application file for complete search history.

(56) References Cited

FOREIGN PATENT DOCUMENTS

| CN | 114447970 A | 5/2022 |
|---|---|---|
| TW | 202230947 A | 8/2022 |

OTHER PUBLICATIONS

International Search Report and Written Opinion of corresponding PCT/CN2024/071838, mailed May 28, 2024 (English and Chinese language translations) (16 pages).

*Primary Examiner* — Robert L Deberadinis

(57) ABSTRACT

A circuit for controlling a DC voltage source current includes a low-voltage DC bus capacitor, a first set of power electronics half-bridge units, a first set of branch circuit inductors, and a first set of DC switches. All of the first set of power electronics half-bridge units are connected in parallel between a positive pole and a negative pole of a low-voltage DC bus and are also connected in parallel with the low-voltage DC bus capacitor, an output neutral point of each power electronics half-bridge unit is connected in series with one of the first set of branch circuit inductors and one of the first set of DC switches to form one of a first set of current-sharing branch circuits, and each power electronics half-bridge unit and the corresponding current-sharing branch circuit are used to be connected with a DC voltage source to form a DC voltage source branch circuit.

20 Claims, 11 Drawing Sheets

CIRCUIT FOR CONTROLLING CURRENT OF DIRECT CURRENT VOLTAGE SOURCE AND CONTROL METHOD

CROSS-REFERENCE TO RELATED APPLICATIONS

This application is based upon and claims priority to Chinese Patent Application No. 202410969699.6 filed on Jul. 18, 2024, and Chinese Patent Application No. 202311255195.X filed on Sep. 26, 2023, the entire contents of which are incorporated herein by reference for all purposes.

TECHNICAL FIELD

The disclosure relates to a technical field of power electronics, in particular to a circuit for controlling a current of a direct current (DC) voltage source and a control method.

BACKGROUND

In a battery energy storage field, in order to avoid the problem of parallel circulating current among battery clusters, usually, a string structure is adopted. Each battery cluster is boosted by a first-stage full-power DC/DC converter and then connected in parallel, which can effectively control the charging and discharging currents and the output voltage of each battery cluster. In the field of photovoltaic power generation, in order to achieve maximum power point tracking (MPPT) of photovoltaic panels, a common scheme is to connect a first-stage full-power DC/DC converter to the output of each photovoltaic string, and control the output voltage and current of the photovoltaic string through the DC/DC converter, so as to achieve MPPT. These occasions essentially belong to the current control problem of DC voltage sources connected in parallel. Although better control performance can be achieved by adding the first-stage full-power DC/DC converter, it also brings disadvantages such as increased cost and poor system efficiency. How to improve the performance and efficiency of string energy storage and the photovoltaic system while reducing costs is a challenge that needs to be urgently addressed in the photovoltaic and energy storage industries. The existing technology provides a schematic diagram of a photovoltaic string or energy storage system as shown in FIG. 1a, where the photovoltaic strings or energy storage branch circuits need to be regulated by the full-power DC/DC converter and then connected in parallel. On the one hand, the DC/DC converter is able to ensure the stability of the output voltage, and on the other hand, it is also able to adapt to voltage change of different photovoltaic strings or energy storage branch circuits, and control the output current of each photovoltaic string or energy storage branch circuit. However, this DC/DC converter needs to work at an environment of high voltage and high current, which may cause energy loss and results in high costs. How to improve the performance and efficiency of large-capacity energy storage and reduce the costs is a challenge that needs to be solved urgently in the current energy storage industry. Another idea is to use partial power converters to compensate for the output voltage by connecting a voltage-adjustable low-voltage DC voltage source in series with the output of each battery cluster as shown in FIG. 1b. However, this method requires one or more externally powered isolated DC power supplies, which increases the cost of the system and reduces the efficiency.

SUMMARY

A first aspect of embodiments of the disclosure proposes a circuit for controlling a current of a direct current (DC) voltage source. The circuit includes: a low-voltage DC bus capacitor, a first set of power electronics half-bridge units, a first set of branch circuit inductors, and a first set of DC switches. All of the first set of power electronics half-bridge units are connected in parallel between a positive pole and a negative pole of a low-voltage DC bus and are also connected in parallel with the low-voltage DC bus capacitor, an output neutral point of each power electronics half-bridge unit is connected in series with one of the first set of branch circuit inductors and one of the first set of DC switches to form one of a first set of current-sharing branch circuits, and each power electronics half-bridge unit and the corresponding current-sharing branch circuit are used to be connected with a DC voltage source to form a DC voltage source branch circuit.

A second aspect of embodiments of the disclosure proposes a control method. The method is applied to a circuit for controlling a current of a direct current (DC) voltage source. The circuit includes a low-voltage DC bus capacitor, a first set of power electronics half-bridge units, a first set of branch circuit inductors, and a first set of DC switches, all of the first set of power electronics half-bridge units being connected in parallel between a positive pole and a negative pole of a low-voltage DC bus and being also connected in parallel with the low-voltage DC bus capacitor, an output neutral point of each power electronics half-bridge unit being connected in series with one of the first set of branch circuit inductors and one of the first set of DC switches to form one of a first set of current-sharing branch circuits, and each power electronics half-bridge unit and the corresponding current-sharing branch circuit are used to be connected with a DC voltage source to form a DC voltage source branch circuit.

The method includes: determining whether to disconnect the DC switch of the DC voltage source branch circuit; and determining a switch control signal of the power electronics half-bridge unit in the DC voltage source branch circuit.

Additional aspects and advantages of embodiments of disclosure will be given in part in the following descriptions, become apparent in part from the following descriptions, or be learned from the practice of embodiments of the disclosure.

BRIEF DESCRIPTION OF THE DRAWINGS

The foregoing and/or additional aspects and advantages of the disclosure will become apparent and readily understood from the following description of embodiments in combination with the accompanying drawings, in which.

DETAILED DESCRIPTION

It is noted that the embodiments and the features in the embodiments of the disclosure can be combined with each other without conflict. The disclosure will be described in detail below with reference to the accompanying drawings and in combination with the embodiments.

In order to enable those skilled in the art to better understand the embodiments of the disclosure, the technical solutions in the embodiments of the disclosure will be described clearly and fully in the following in combination with the accompanying drawings in the embodiments of the disclosure. Obviously, the described embodiments are only a part of the embodiments of the disclosure and not all of the embodiments. Based on the embodiments in the disclosure, all the other embodiments obtained by those skilled in the art without inventive work shall fall within the scope of protection of the disclosure.

A current control circuit for DC voltage sources connected in parallel and a control method of embodiments of the disclosure are described below with reference to the accompanying drawings.

Figure 1A:
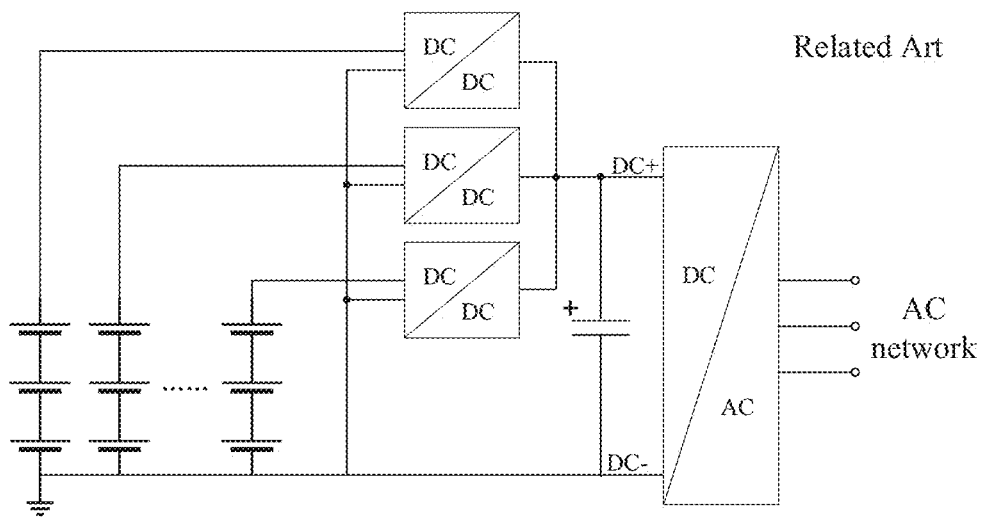
FIG. 1a is a circuit consisting of voltage sources connected in parallel in strings in the related art.
Figure 1B:
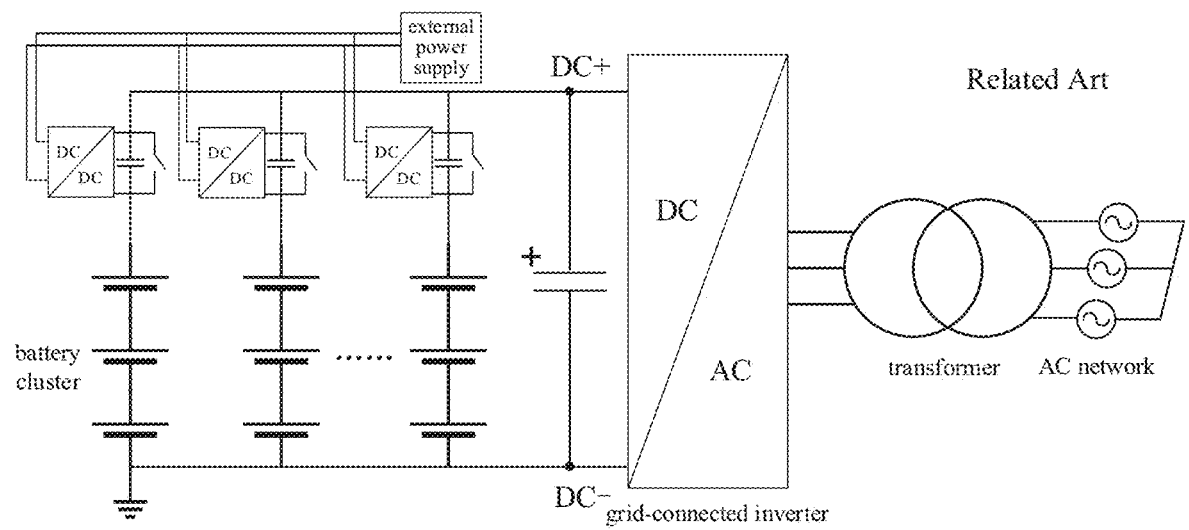
FIG. 1b is a compensate battery energy storage circuit in which voltage sources connected in series in the related art.
Figure 2:
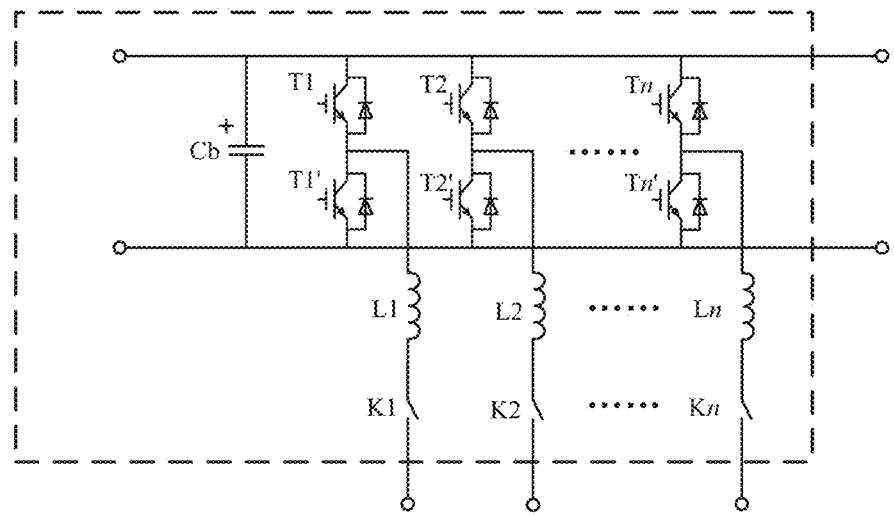
FIG. 2 is a structural diagram of a circuit for controlling a current of a DC voltage source of an embodiment of the disclosure.

FIG. 2 is a structural diagram of a circuit for controlling a current of a DC voltage source of an embodiment of the disclosure. As shown in FIG. 2, the circuit includes a low-voltage DC bus capacitor $C_b$, n power electronics half-bridge units (n is a positive integer), and n branch circuit inductors, and n DC switches. All the power electronics half-bridge units are connected in parallel between a positive pole and a negative pole of a low-voltage DC bus. An output neutral point of each power electronics half-bridge unit is connected in series with a branch circuit inductor and a DC switch sequentially to form a current-sharing branch circuit. Each power electronics half-bridge unit and the corresponding current-sharing branch circuit are used to be connected with a DC voltage source to form a DC voltage source branch circuit. To achieve output current control of n DC voltage sources in parallel, the same poles of n DC voltage sources are connected to n current-sharing branch circuits of the current control circuit respectively, and the other poles of these DC voltage sources are coupled together as an output end of a medium-voltage DC bus.

In order to avoid the uneven current problem brought about by direct parallel connection of DC voltage sources such as photovoltaic or energy storage while reducing the power and cost of DC/DC converters in a photovoltaic string or energy storage system, and to achieve effective control of the output current of each DC voltage source branch circuit, some embodiments of the disclosure provide a current control circuit for DC voltage sources connected in parallel and a control method. The idea is to firstly connect an inductor in series with each DC voltage source branch circuit to form a current source, and then connect a power electronics half-bridge unit in series, so that the current of a branch circuit inductor can be adjusted by the power electronics half-bridge unit in a pulse-width modulation (PWM) chopper mode, thereby achieving precise control of the current of each DC voltage source.

Figure 3:
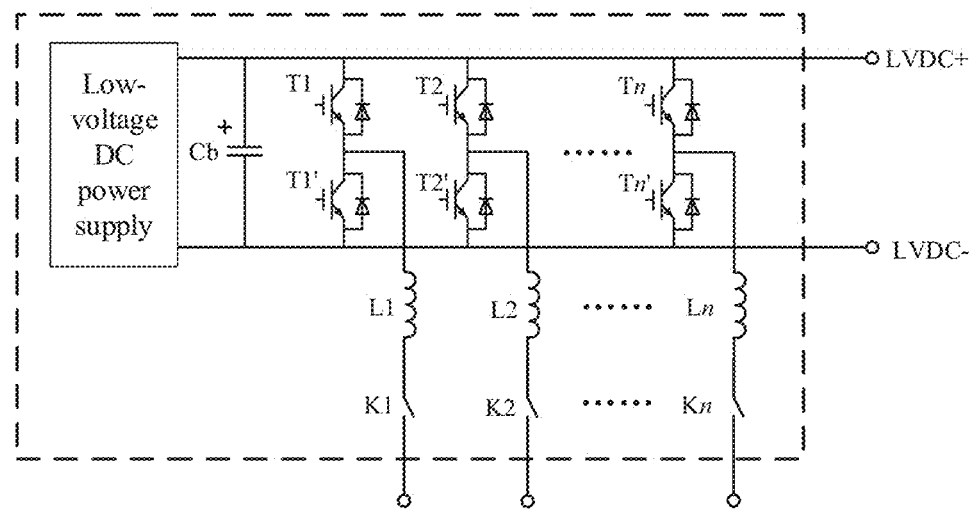
FIG. 3 is a structural diagram of a current control circuit in which DC voltage sources are connected in parallel of an embodiment of the disclosure.

FIG. 3 is a structural diagram of a current control circuit for DC voltage sources connected in parallel according to an embodiment of the disclosure. As illustrated in FIG. 3, the circuit includes: a low-voltage DC power supply, a low-voltage DC bus capacitor $C_b$, n power electronics half-bridge units (n being an integer), n branch circuit inductors, and n DC switches. An output end of the low-voltage DC power supply is connected in parallel with the low-voltage DC bus capacitor $C_b$ to provide a stable DC voltage. All the power electronics half-bridge units are connected in parallel between the positive pole LVDC+ and the negative pole LVDC− of the low-voltage DC bus. An output neutral point of each power electronics half-bridge unit is connected in series with a branch circuit inductor and a DC switch sequentially to form a current-sharing branch circuit. In order to achieve the output current control of n DC voltage sources connected in parallel, the same poles of n DC voltage sources are connected to n current-sharing branch circuits of the current control circuit respectively, and the other poles of these DC voltage sources are coupled together as an output end of a medium-voltage DC bus, while one pole of the low-voltage DC bus is used as another output end of the medium-voltage DC bus. Further, a filter capacitor is connected in parallel between positive and negative poles of the medium-voltage DC bus, so as to form an output end of the DC voltage sources connected in parallel to supply power to a load.

Figure 4:
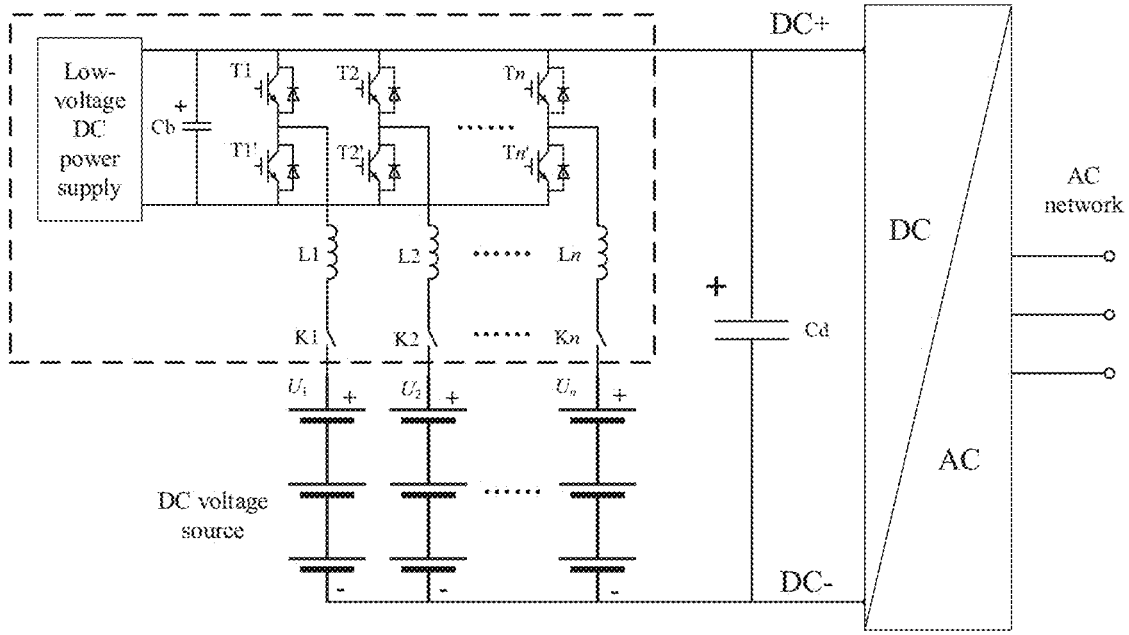
FIG. 4 is a schematic diagram of a first circuit connection of a current control circuit in which DC voltage sources are connected in parallel of an embodiment of the disclosure.
Figure 5:
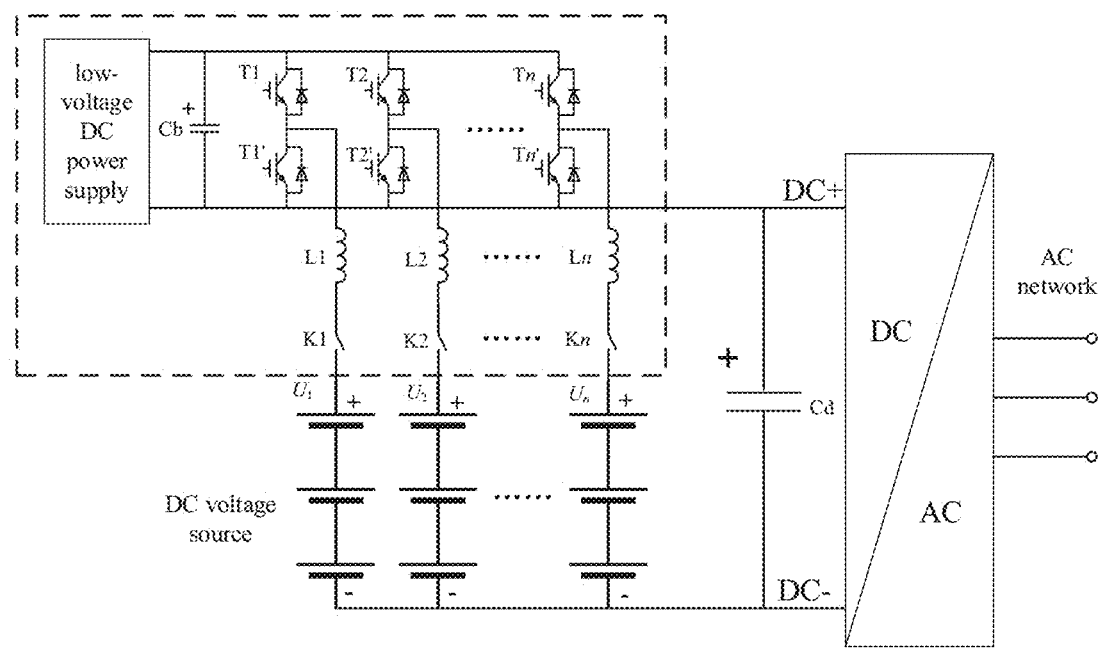
FIG. 5 is a schematic diagram of a second circuit connection of a current control circuit in which DC voltage sources are connected in parallel of an embodiment of the disclosure.

In an embodiment, positive poles of n DC voltage sources are connected to the current-sharing branch circuits respectively. As shown in FIGS. 4 and 5, negative poles of the n DC voltage sources are coupled together as the negative pole DC− of the medium-voltage DC bus, while the positive pole of the low-voltage DC bus is used as the positive pole DC+ of the medium-voltage DC bus as shown in FIG. 4, or the negative pole of the low-voltage DC bus is used as the positive pole DC+ of the medium-voltage DC bus as shown in FIG. 5.

Figure 6:
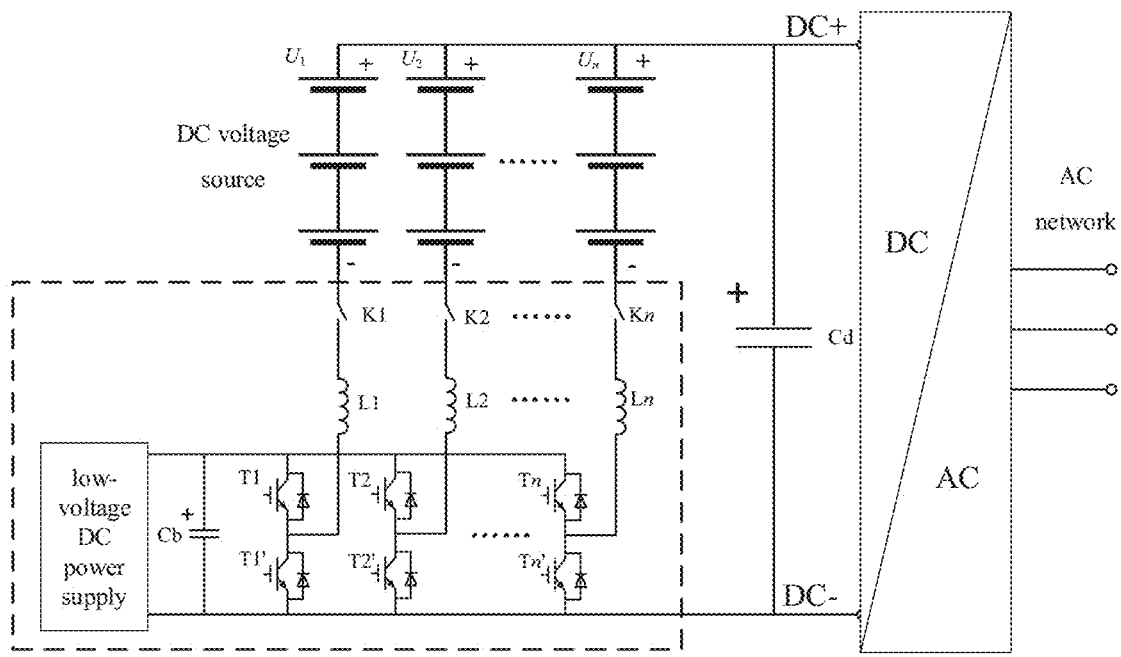
FIG. 6 is a schematic diagram of a third circuit connection of a current control circuit in which DC voltage sources are connected in parallel of an embodiment of the disclosure.
Figure 7:
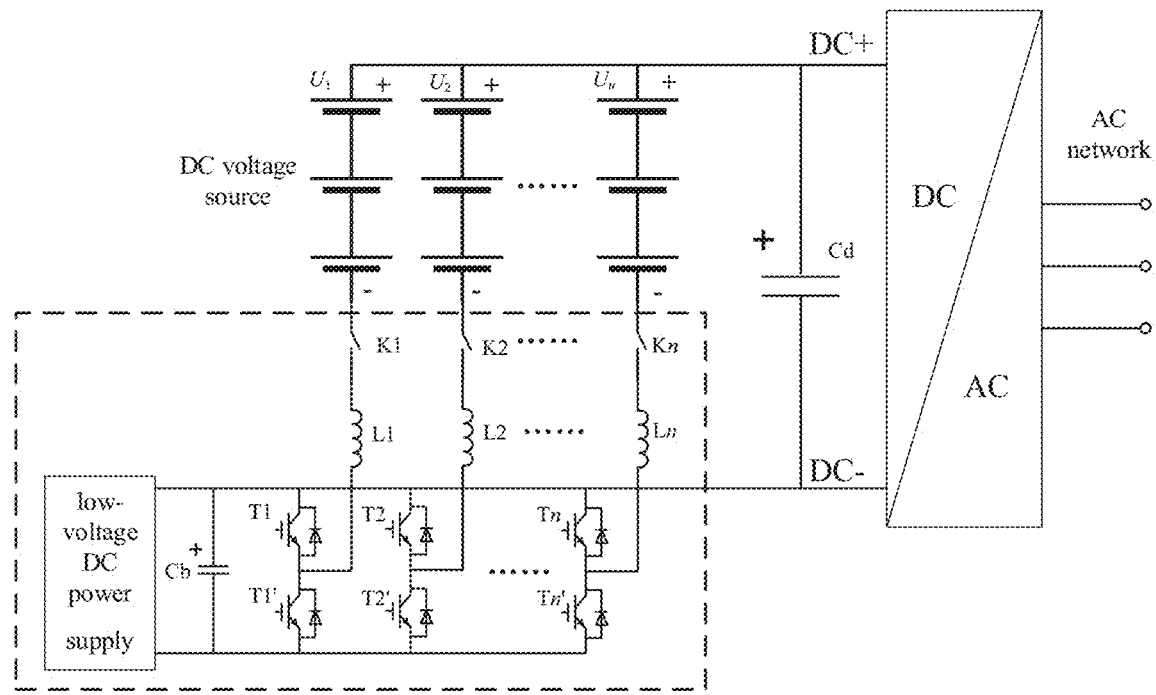
FIG. 7 is a schematic diagram of a fourth circuit connection of a current control circuit in which DC voltage sources are connected in parallel of an embodiment of the disclosure.

In an embodiment, negative poles of the n DC voltage sources are connected to the current-sharing branch circuits respectively. As shown in FIGS. 6 and 7, positive poles of the n DC voltage sources are coupled together as the positive pole DC+ of the medium-voltage DC bus, while the negative pole of the low-voltage DC bus is used as the negative pole DC− of the medium-voltage DC bus as shown in FIG. 6, or the positive pole of the low-voltage DC bus is used as the negative pole DC− of the medium-voltage DC bus as shown in FIG. 7.

In an embodiment of the disclosure, assuming that voltages of the first set of DC voltage sources are $U_1, U_2, \ldots, U_n$, the maximum voltage is $U_{max}$, the minimum voltage is $U_{min}$, a voltage of the low-voltage DC bus is $U_b$, and a voltage of the medium-voltage DC bus is $U_d$; the power electronics half-bridge unit operates in a complementary state, and a switching function of an upper switch $T_j$ of the power electronics half-bridge unit is defined as $S_j$, j=1, 2, ..., n; when the upper switch is on and a lower switch is off, $S_j=1$, and when the upper switch is off and the lower switch is on, $S_j=0$.

In an embodiment of the disclosure, taking the connection shown in FIG. 4 as an example, the direction in which the current flowing out of the half-bridge unit is considered as a positive direction, an inductor voltage on the $j^{th}$ branch circuit is:

$$u_{Lj} = U_d - U_j - (1 - S_j)U_b. \tag{1}$$

To make the conductor current controllable, in a case that the half-bridge unit operates in a pulse-width modulation (PWM) chopper mode, if Eq. (1) satisfies that $u_{Lj}>0$ when $S_j=1$ to increase an inductor current and $u_{Lj}<0$ when $S_j=0$ to decrease the inductor current, to make an average value of the inductor current controllable, an output voltage of the medium-voltage DC bus needs to satisfy Eq. (2):

$$U_{max} < U_d < U_b + U_{min}. \tag{2}$$

From Eq. (2), it can be concluded that the output voltage $U_d$ of the medium-voltage DC bus must be greater than the maximum voltage of the DC power supply, and less than a sum of the minimum voltage of the DC power supply and the voltage of the low-voltage DC bus, and thus the voltage $U_b$ of the low-voltage DC bus must also be greater than a difference between the maximum voltage $U_{max}$ and the minimum voltage $U_{min}$ of the DC power supply.

On the basis of an increased amount and a decreased amount of inductor current within one switching cycle at steady state being identical, and according to Eq. (1), it is obtained:

$$\frac{U_d - U_j}{L_j} \cdot T_{on} = -\frac{U_d - U_j - U_b}{L_j} \cdot T_{off}; \tag{3}$$

where $T_{on}$ and $T_{off}$ represent an on time and an off time of the upper switch $T_j$ of the half-bridge unit within one switching cycle, respectively, and Lj represents a branch circuit inductor, a duty cycle $d_j$ of the switching function $S_j$ within one switching cycle at steady state is:

$$d_j = \frac{T_{on}}{T_{on} + T_{off}} = (U_j + U_b - U_d)/U_b. \tag{4}$$

By bringing Eq. (2) into Eq. (4), it yields that a range of the duty cycle $d_j$ is from 0 to 1, which proves the correctness of the analyze result.

In an embodiment of the disclosure, according to the second circuit connection shown in FIG. 5, the inductor voltage on the $j^{th}$ branch circuit is:

$$u_{Lj} = U_d - U_j + S_j \cdot U_b. \tag{5}$$

With the same ideas, it can be deduced that an output voltage of the medium-voltage DC bus needs to satisfy:

$$U_{max} - U_b < U_d < U_{min}; \tag{6}$$

a duty cycle $d_j$ of the switching function $S_j$ within one switching cycle at steady state is:

$$d_j = (U_j - U_d)/U_b. \tag{7}$$

By bring Eq. (6) into Eq. (7), it yields that a range of the duty cycle $d_j$ is from 0 to 1, which proves the correctness of the analyze result.

In an embodiment of the disclosure, according to the third circuit connection shown in FIG. 6, the inductor voltage on the $j^{th}$ branch circuit is:

$$u_{Lj} = U_j + S_j \cdot U_b - U_d. \tag{8}$$

With the same ideas, it can be deduced that an output voltage of the medium-voltage DC bus needs to satisfy:

$$U_{max} < U_d < U_b + U_{min}; \tag{9}$$

a duty cycle $d_j$ of the switching function $S_j$ within one switching cycle at steady state is:

$$d_j = (U_d - U_j)/U_b. \tag{10}$$

By bring Eq. (9) into Eq. (10), it yields that a range of the duty cycle $d_j$ is from 0 to 1, which proves the correctness of the analyze result.

In an embodiment of the disclosure, according to the fourth circuit connection shown in FIG. 7, the inductor voltage on the $j^{th}$ branch circuit is:

$$u_{Lj} = U_j - (1 - S_j) \cdot U_b - U_d. \quad (11)$$

With the same ideas, it can be deduced that an output voltage of the medium-voltage DC bus needs to satisfy:

$$U_{max} - U_b < U_d < U_{min}; \quad (12)$$

a duty cycle $d_j$ of the switching function $S_j$ within one switching cycle at steady state is:

$$d_j = (U_d + U_b - U_j)/U_b. \quad (13)$$

By bring Eq. (12) into Eq. (13), it yields that a range of the duty cycle $d_j$ is from 0 to 1, which proves the correctness of the analyze result.

Therefore, for the four different connections mentioned above, it is only necessary that the magnitude relation among the voltage of the medium-voltage DC bus, the voltage of the low-voltage DC bus and the voltage of the DC voltage source satisfy equations (2), (6), (9) or (12), respectively, the inductor current can be controlled by controlling the duty cycle of the half-bridge unit switch, which in steady state satisfies equations (4), (7), (10) or (13), respectively. If the voltage of the DC voltage source of a certain branch circuit is too high or too low to satisfy equations (2), (6), (9) or (12), the DC switch corresponding to that branch circuit may be disconnected to remove the branch circuit.

Figure 8:
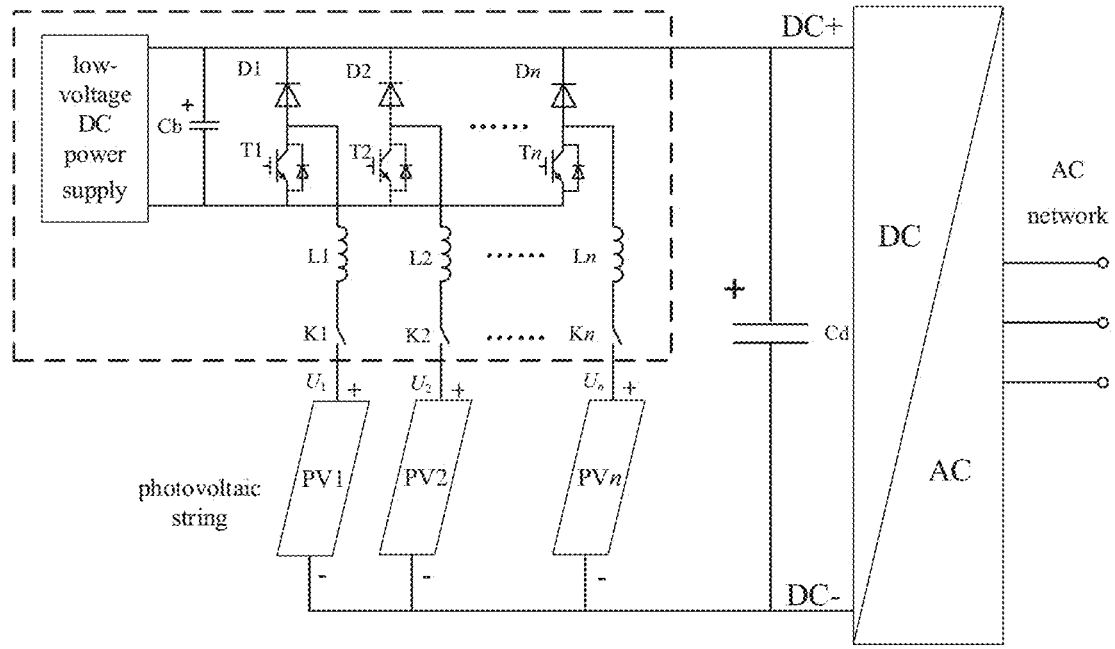
FIG. 8 is a schematic diagram of a first circuit connection of a current control circuit in which DC voltage sources are connected in parallel used for a photovoltaic string of an embodiment of the disclosure.
Figure 9:
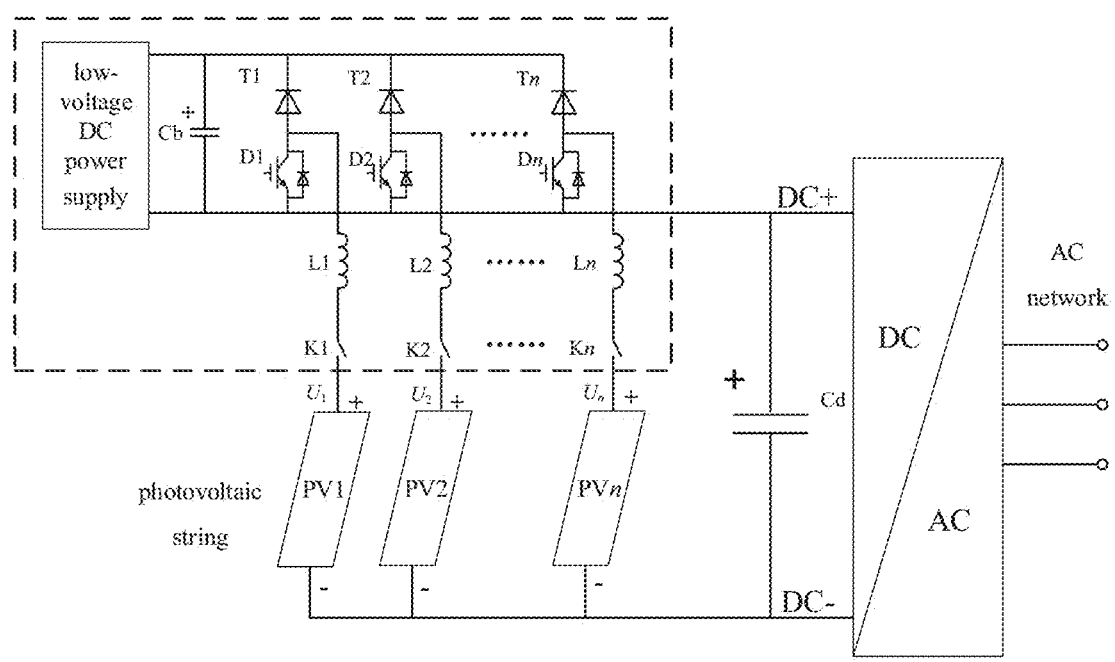
FIG. 9 is a schematic diagram of a second circuit connection of a current control circuit in which DC voltage sources are connected in parallel used for a photovoltaic string of an embodiment of the disclosure.
Figure 10:
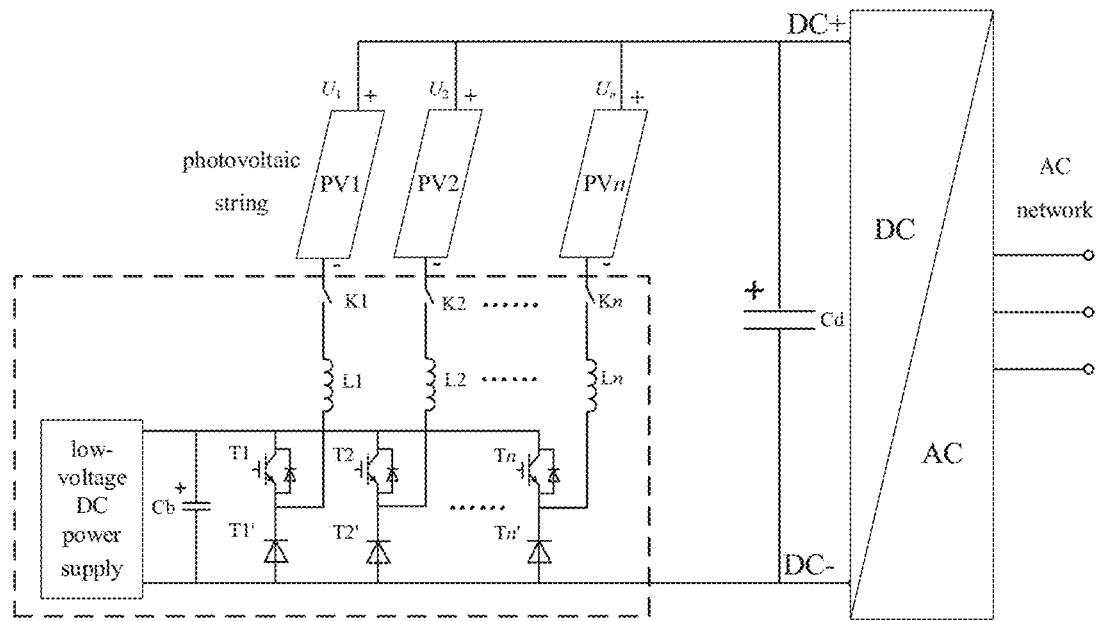
FIG. 10 is a schematic diagram of a third circuit connection of a current control circuit in which DC voltage sources are connected in parallel used for a photovoltaic string of an embodiment of the disclosure.
Figure 11:
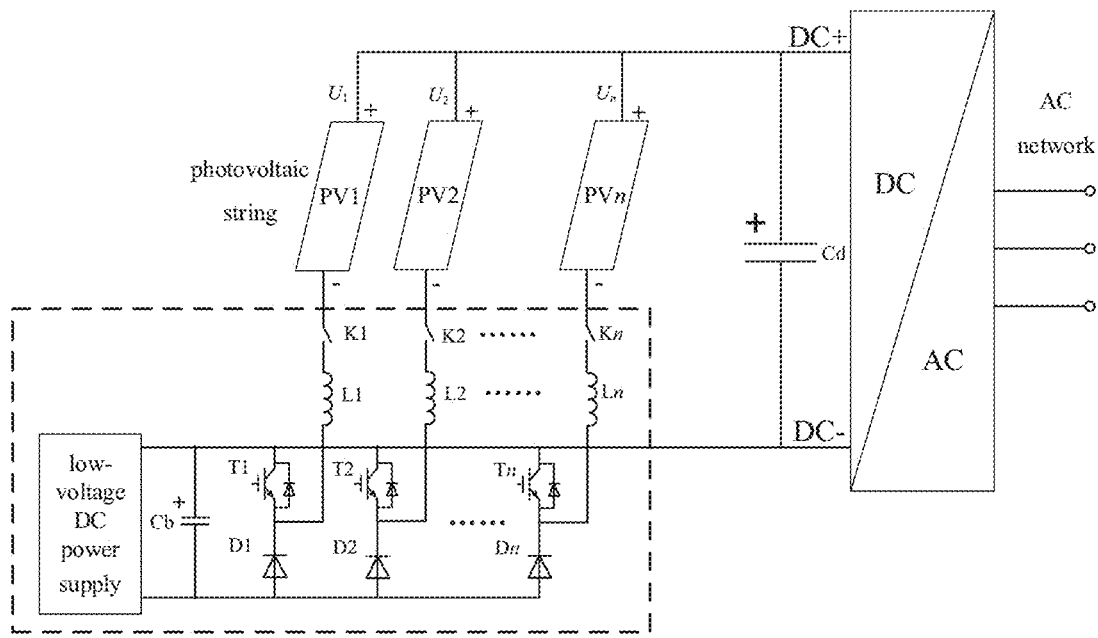
FIG. 11 is a schematic diagram of a fourth circuit connection of a current control circuit in which DC voltage sources are connected in parallel used for a photovoltaic string of an embodiment of the disclosure.

In some embodiments of the present disclosure, the DC power source is a power source that requires only unidirectional power output such as a photovoltaic string. In this case, the cost can be reduced by replacing one of the two fully-controlled switching components of the power electronics half-bridge unit with a diode. When the positive pole of the DC voltage source is connected to the current-sharing branch circuit, because the current always flows into the current-sharing branch circuit from the photovoltaic string, as shown in FIGS. 8 and 9, the upper switch of the power electronics half-bridge unit can be replaced by a diode. When the negative pole of the DC voltage source is connected to the current-sharing branch circuit, because the current always flows into the photovoltaic string from the current-sharing branch circuit, as shown in FIGS. 10 and 11, the lower switch of the power electronics half-bridge unit can be replaced by a diode.

In an embodiment of the present disclosure, the low-voltage DC power supply is an isolated AC/DC converter using AC power supply or an isolated DC/DC converter using DC power supply.

With the current control circuit for DC voltage sources connected in parallel according to an embodiment of the disclosure, the DC voltage sources connected in parallel are converted into current sources connected in parallel by connecting an inductor and a power electronics half-bridge unit in series to each DC voltage source branch circuit. The adopted current closed-loop control has high precision and good current control performance. The proposed current control circuit has low voltage and low power, and avoids usage of the full-power DC/DC converter in the traditional string schemes, which significantly reduces the size and cost of the system, and improves the efficiency. The proposed current control circuit adopts a shared DC bus structure, and all the branch circuits only need to be powered by a shared and independent DC power supply, which is low cost.

Figure 12:
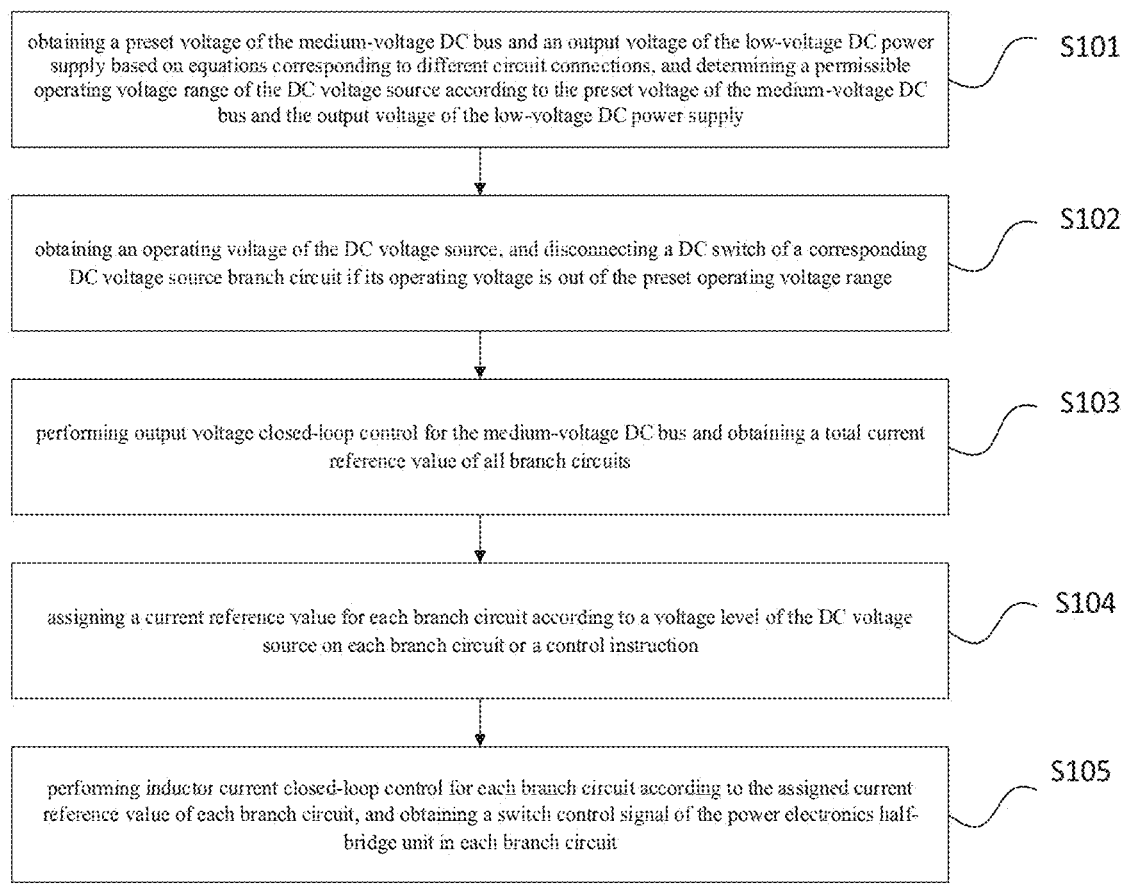
FIG. 12 is a flowchart of a control method for a current control circuit for DC voltage sources connected in parallel of an embodiment of the disclosure.

In order to realize the above embodiments, as shown in FIG. 12, the embodiment provides a method for controlling a current control circuit for DC voltage sources connected in parallel. Based on the DC voltage sources whose charging and discharging powers are controllable, using voltage-current double closed-loop control, the method includes:

S101, based on different circuit connections, determining a permissible operating voltage range of the DC voltage source according to a preset voltage of a medium-voltage DC bus and an output voltage of a low-voltage DC power supply, which are obtained according to equations (2), (6), (9) or (12), respectively;

S102, obtaining an operating voltage of the DC voltage source, and disconnecting a DC switch of a corresponding DC voltage source branch circuit if its operating voltage is out of the preset operating voltage range;

S103, performing output voltage closed-loop control for the medium-voltage DC bus and obtaining a total current reference value for all branch circuits;

S104, assigning a current reference value for each branch circuit according to a voltage level of the DC voltage source on each branch circuit or a control instruction; and S105, performing inductor current closed-loop control for each branch circuit according to the assigned current reference value of each branch circuit, and obtaining a switch control signal of the power electronics half-bridge unit on each branch circuit.

In detail, for a DC voltage source whose charging and discharging power are controllable, such as a battery cluster, using voltage-current double closed-loop control, the steps of the control method include:

for different circuit connections, determining a permissible operating voltage range $[U_{min}, U_{max}]$ of the DC voltage source according to a preset voltage of the medium-voltage DC bus and an output voltage of the low-voltage DC power supply based on Eqs. (2), (6), (9) or (12), respectively;

obtaining an operating voltage of each DC voltage source, disconnecting a DC switch of a corresponding DC voltage source branch circuit if its operating voltage is out of the permissible operating voltage range to remove that branch circuit;

performing output voltage closed-loop control for the medium-voltage DC bus, and obtaining a reference value of a total amount of current of all branch circuits;

assigning a current reference value for each branch circuit according to a voltage level of the DC voltage source on each branch circuit, a size of SOC or a control instruction;

generally, when discharging, a larger current reference value is assigned to the DC voltage source branch circuit with a higher voltage or a higher SOC, and a smaller current reference value is assigned to the DC voltage source branch circuit with a lower voltage or a lower SOC. When charging, a smaller current reference value is assigned to the DC voltage source branch circuit with a higher voltage or a higher SOC, and a larger current reference value is assigned to the DC voltage source branch circuit with a lower voltage or a lower SOC; and the inductor current closed-loop control is performed for each branch circuit according to the assigned current reference value, and a switch control signal of each power electronics half-bridge unit on each branch circuit is obtained.

In some embodiments of the present disclosure, for a DC voltage source with MPPT requirements, such as a photovoltaic string, the voltage of the medium-voltage DC bus is generally controlled by a back-end circuit in the following steps.

For different circuit connections, a permissible operating voltage range [$U_{min}$, $U_{max}$] of a photovoltaic string is determined according to a preset voltage of the medium-voltage DC bus and an output voltage of the low-voltage DC power supply based on Eqs. (2), (6), (9) or (12), respectively.

An MPPT algorithm is adopted to obtain an inductor current reference value for each photovoltaic string branch circuit. Since the voltage of the output end of the photovoltaic string varies with the output current, it needs to be ensured that the voltage of the output end of the photovoltaic string is within the permissible operating voltage range [$U_{min}$, $U_{max}$] during the MPPT process.

The inductor current closed-loop control is performed for each branch circuit, so that it always operates using the current required for realizing the MPPT of the photovoltaic string. The switch control signal of each power electronics half-bridge unit on each branch circuit is obtained.

The control method for the current control circuit for DC voltage sources connected in parallel according to an embodiment of the disclosure avoids the problem of uneven current brought about by the direct parallel connection of DC voltage sources such as photovoltaic or energy storage, and at the same time, reduces the power and cost of the DC/DC converter in the photovoltaic string or energy storage system, and realizes the effective control of the output current of each DC voltage source branch circuits.

Further, in order to avoid the circulation problem brought about by the direct parallel connection of a large number of battery clusters in a centralized energy storage system while reducing the power and cost of the DC/DC converters in a two-stage energy storage system, another object of the disclosure is to propose a solution of connecting battery clusters in series-parallel to form a current-sharing system. It has the following advantages. (1) The circuit is simplified and the cost is reduced by adopting a low-voltage small-power half-bridge circuit with a shared low-voltage DC bus. (2) The indirect series connection of the two battery clusters creates higher output voltage and has greater capacity, and it also balances the power of the low-voltage DC bus and eliminates the need for an external power supply, and thus the system cost is reduced and the efficiency is improved.

Figure 13:
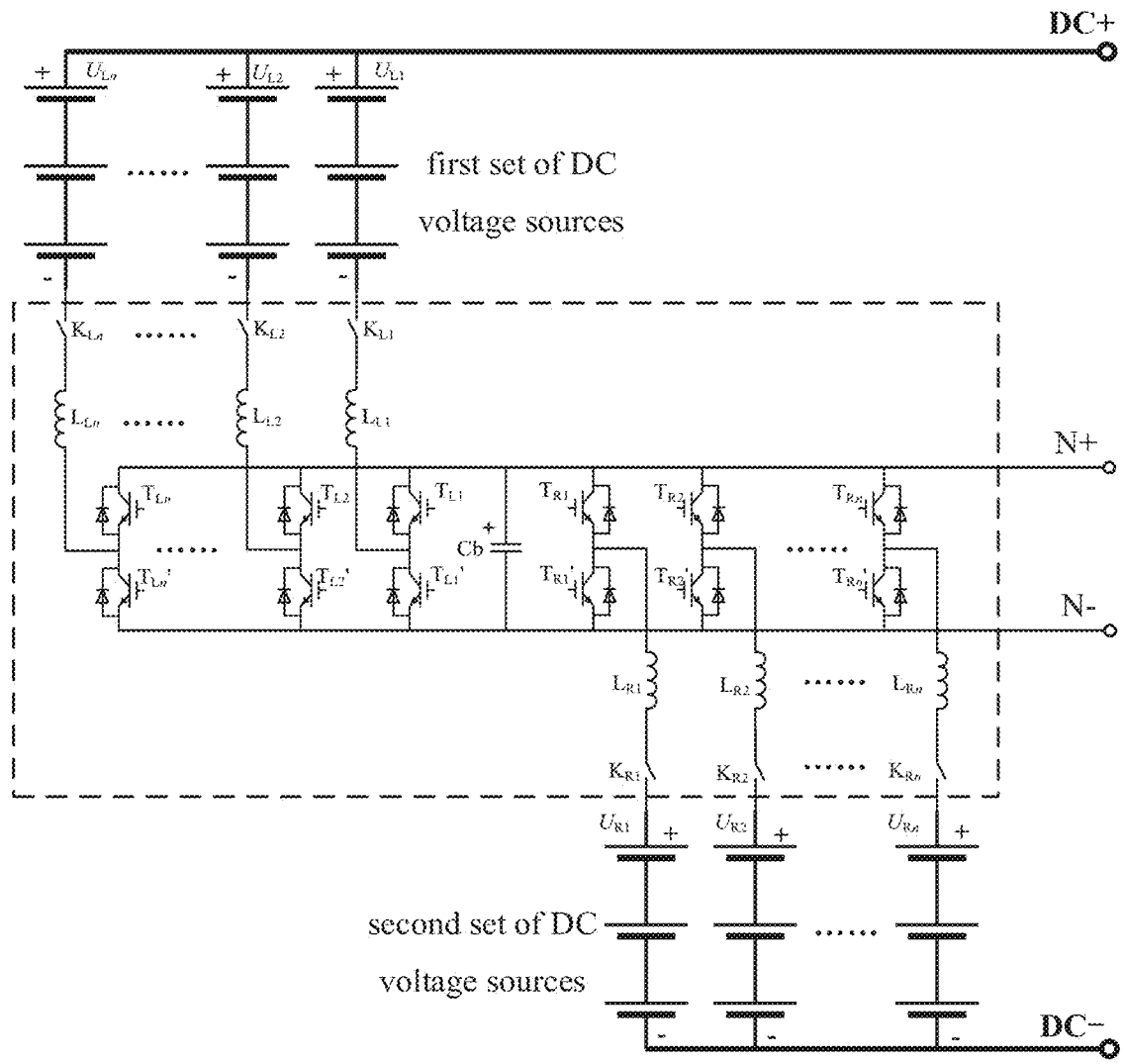
FIG. 13 is a schematic diagram of a current-sharing system with DC voltage sources connected in series-parallel of an embodiment of the disclosure.

FIG. 13 is a schematic diagram of a current-sharing system with DC voltage sources connected in series-parallel of an embodiment of the disclosure.

As illustrated in FIG. 13, the system includes: a set of n DC voltage sources, 1 low-voltage DC bus capacitor, 2n power electronics half-bridge units, 2n branch circuit inductors, and 2n DC switches, n being a positive integer greater than or equal to 2.

In an embodiment of the present disclosure, the power electronics half-bridge unit includes two switching components connected in series, and an emitter of an upper switch is connected to a collector of a lower switch and together serves as a neutral point of the power electronics half-bridge unit.

In an embodiment of the present disclosure, collectors of upper switches of all the power electronics half-bridge units are connected to a positive pole of the low-voltage DC bus capacitor $C_b$ to form the positive pole N+ of the low-voltage DC bus, and emitters of lower switches of all the power electronics half-bridge units are connected to a negative pole of the low-voltage DC bus capacitor $C_b$ to form the negative pole N− of the low-voltage DC bus.

In an embodiment of the present disclosure, an output neutral point of each power electronics half-bridge unit is connected in series with a branch circuit inductor and a DC switch to form a current-sharing branch circuit.

In an embodiment of the present disclosure, negative poles of the first set of n DC voltage sources are connected to the first set of n current-sharing branch circuits respectively, and positive poles of the first set of n DC voltage sources are coupled together to form a positive pole DC+ of the medium-voltage DC bus; positive poles of the second set of n DC voltage sources are connected to the second set of n current-sharing branch circuits respectively, and negative poles of the second set of n DC voltage sources are coupled together to act as a negative pole DC− of the medium-voltage DC bus; the positive pole N+ or the negative pole N− of the low-voltage DC bus is used as the neutral point of the medium-voltage DC bus.

Figure 14:
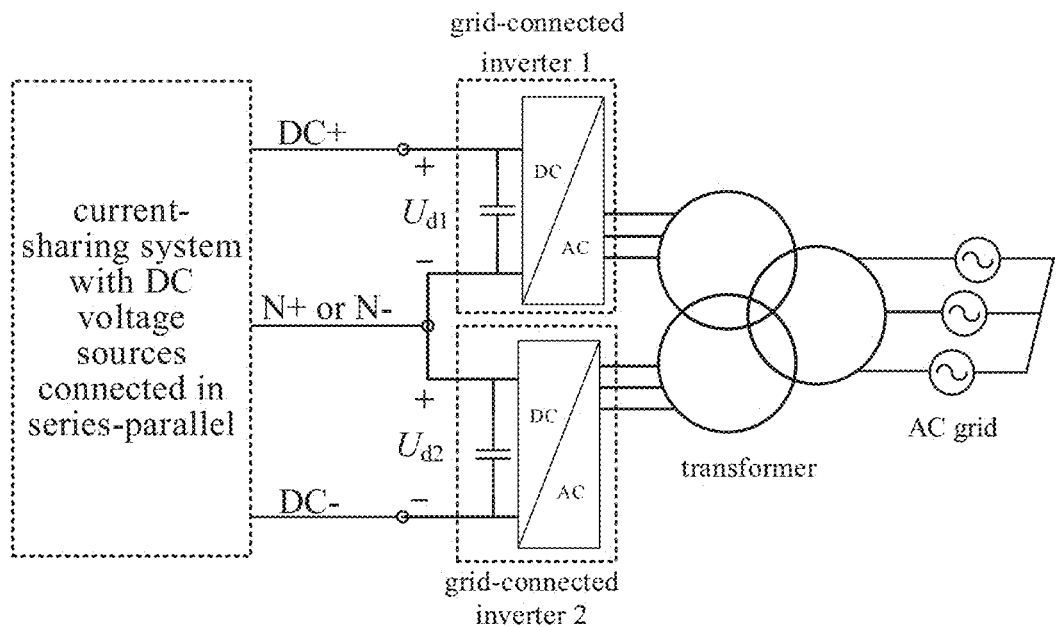
FIG. 14(*a*), FIG. 14(*b*) and FIG. 14(*c*) are schematic diagrams of three connections for connecting the current-sharing system with DC voltage sources connected in series-parallel with a grid-connected inverter respectively of embodiments of the disclosure.
Figure 14:
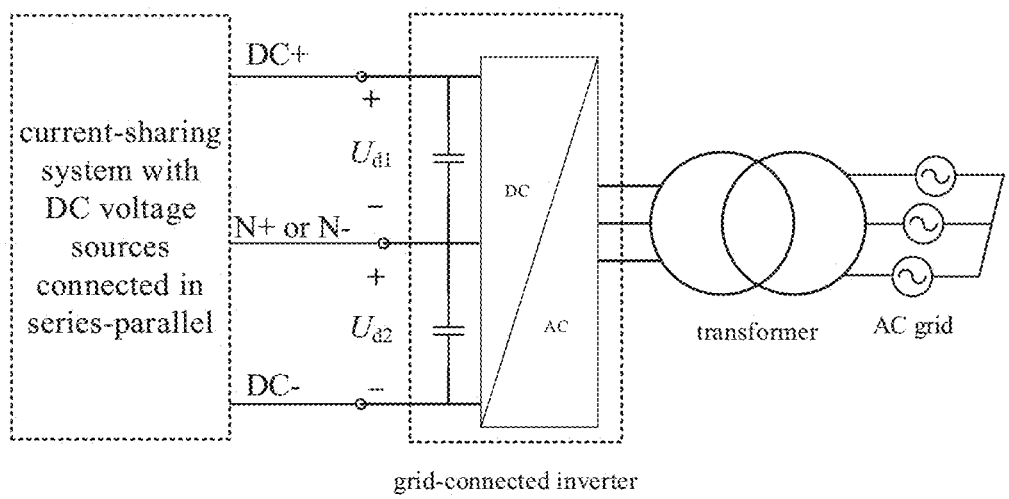
Figure 14:
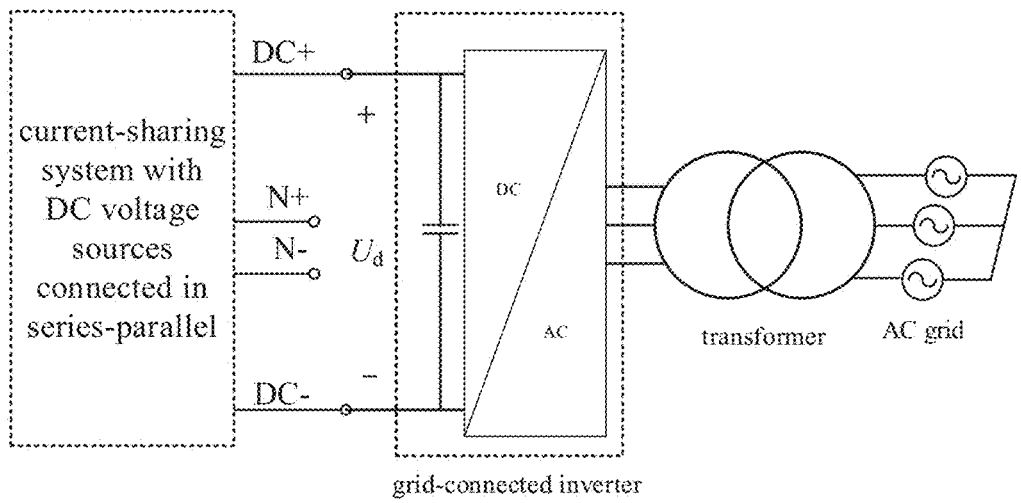

In an embodiment of the present disclosure, when the circuit is used in a large-scale battery energy storage system, a grid-connected inverter is connected between the positive pole of the medium-voltage DC bus and a neutral point N+ or N−, another grid-connected inverter is connected between the same neutral point and the negative pole, and the two inverters are connected to a grid through a double-split transformer to form a fifth circuit connection as shown in FIG. 14 (a).

In an embodiment of the present disclosure, a grid-connected inverter is connected to the positive pole of the medium-voltage DC bus, the neutral point N+ or N−, and the negative pole through a DC bus neutral point, and then connected to the grid through a step-up transformer, to form a sixth circuit connection as shown in FIG. 14 (b).

In an embodiment of the present disclosure, a grid-connected inverter acting as a load is connected between the positive and negative poles of the medium-voltage DC bus without connecting to the neutral point, and then connected to the grid through the step-up transformer to form a seventh circuit connection as shown in FIG. 14 (c).

It is understood that, compared with the related art, in the disclosure, the negative poles of the first set of DC voltage sources are connected to the current-sharing branch circuits, and the positive poles of the second set of DC voltage sources are connected to the current-sharing branch circuits. The advantages are that it realizes the indirect series connection of two sets of DC voltage sources, and the output voltage is higher, and that it also makes the voltage of the low-voltage DC bus capacitor remain stable by adopting a certain control method, which does not require external power supply.

Assuming that the maximum voltage in the first set of n DC voltage sources is $U_{Lmax}$, and the minimum voltage is $U_{Lmin}$, the maximum voltage in the second set of n DC voltage sources is $U_{Rmax}$ and the minimum voltage is $U_{Rmin}$, and a voltage of the low-voltage DC bus is $U_b$, when adopting the fifth or sixth circuit connection shown in FIG. 14 (a) or FIG. 14 (b),
if the neutral point connected to the output end is N+, the output voltage $U_{d1}$ of the first set of DC voltage sources connected in parallel satisfies:

$$U_{Lmax} - U_b < U_{d1} < U_{Lmin}; \qquad (14)$$

an output voltage $U_{d2}$ of the second set of DC voltage sources connected in parallel satisfies:

$$U_{Rmax} < U_{d2} < U_b + U_{Rmin}; \quad (15)$$

if the neutral point connected to the output end is N−, the output voltage $U_{d1}$ of the first set of DC voltage sources connected in parallel satisfies:

$$U_{Lmax} < U_{d1} < U_b + U_{Lmin}; \quad (16)$$

an output voltage $U_{d2}$ of the second set of DC voltage sources connected in parallel satisfies:

$$U_{Rmax} - U_b < U_{d2} < U_{Rmin}; \quad (17)$$

when adopting the seventh circuit connection shown in FIG. 14 (c),
an output voltage $U_d$ of the medium-voltage DC bus after connecting the first set of DC voltage sources and the second set of DC voltage sources in series satisfies:

$$U_{Lmax} + U_{Rmax} - U_b < U_d < U_{Lmin} + U_{Rmin} + U_b; \quad (18)$$

the magnitude of the voltage $U_b$ of the low-voltage DC bus satisfies Eq. (19) according to Eqs. (14)-(18):

$$\begin{cases} U_b > U_{Lmax} - U_{Lmin} \\ U_b > U_{Rmax} - U_{Rmin} \end{cases}. \quad (19)$$

In order to minimize losses, the preset voltage value of the low-voltage DC bus is as small as possible while satisfying Eq. (19).

With the current-sharing system with DC voltage sources connected in series-parallel of the embodiment of the disclosure, the circuit is simplified by adopting a low-voltage small-power half-bridge circuit with a shared low-voltage DC bus, while eliminating the need for an external power supply, and thus the system cost is reduced and the efficiency is improved.

Figure 15:
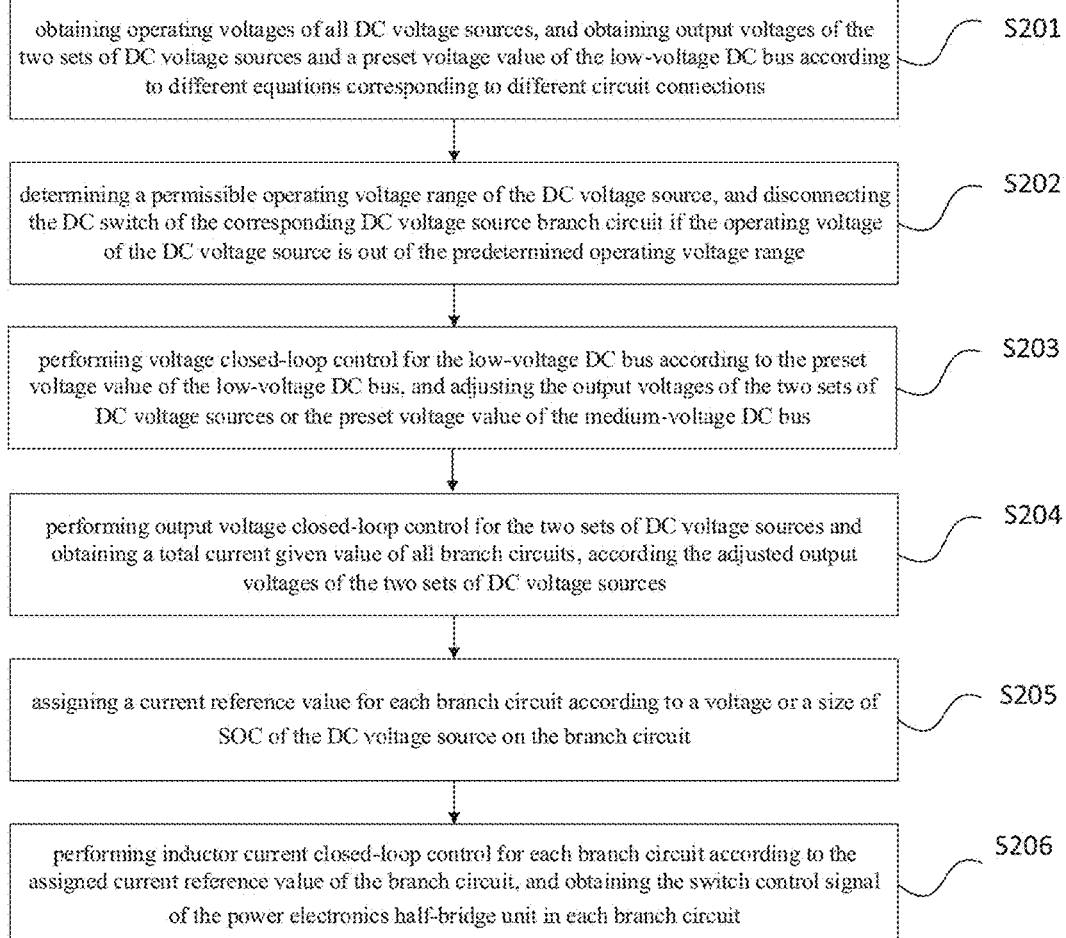
FIG. 15 is a flowchart of a control method for the current-sharing system with DC voltage sources connected in series-parallel of an embodiment of the disclosure.

In order to realize the above embodiments, as shown in FIG. 15, a control method applied to the current-sharing system with DC voltage sources connected in series-parallel is provided in the embodiment of the disclosure. The method uses a voltage-current double closed-loop control, and includes:

S201, obtaining operating voltages of all DC voltage sources, and based on different circuit connections, obtaining output voltages of the two sets of DC voltage sources and a preset voltage value of a low-voltage DC bus according to the above Eqs. (14)-(19);

S202, setting a permissible operating voltage range of the DC voltage source, and disconnecting a DC switch of the corresponding DC voltage source branch circuit if its operating voltage is out of a preset operating voltage range;

S203, performing voltage closed-loop control for the low-voltage DC bus according to the preset voltage value of the low-voltage DC bus in S201, and adjusting the output voltages of the two sets of DC voltage sources or the preset voltage value of the medium-voltage DC bus;

S204, according the adjusted output voltages of the two sets of DC voltage sources in S203, performing output voltage closed-loop control for the two sets of DC voltage sources and obtaining a total current reference value of all branches;

S205, assigning a current reference value for each branch circuit according to a voltage or a size of SOC of the DC voltage source on each branch circuit;

S206, performing inductor current closed-loop control for each branch circuit according to the assigned current reference value of each branch circuit, and obtaining the switch control signal of the power electronics half-bridge unit on each branch circuit.

In detail, step S203 of performing voltage closed-loop control for the low-voltage DC bus based on different circuit connections includes the following steps.

In order to achieve the goal of getting rid of the external power supply, it is necessary to ensure that the voltage of the low-voltage DC bus remains stable. Taking the fifth or sixth circuit connection shown in FIG. 14(a) or FIG. 14(b) as an example, and the neutral point N+ is connected, when the energy storage system discharges, the first set of DC voltage sources causes the low-voltage DC bus capacitor to charge, and the second set of DC voltage sources may cause the low-voltage DC bus capacitor to discharge, and thus the voltage of the low-voltage DC bus capacitor can be controlled by adjusting the output voltage of the DC bus.

In an implementation, when the energy storage system is discharged, if the voltage of the low-voltage DC bus is greater than a rated value, an output voltage $U_{d1}$ of the first set of DC voltage sources is increased, so that an amount of charging energy of a low-voltage DC bus capacitor is decreased; and/or an output voltage $U_{d2}$ of the second set of DC voltage sources is increased, so that the amount of discharging energy of the low-voltage DC bus capacitor is increased.

If the voltage of the low-voltage DC bus is less than the rated value, the output voltage $U_{d1}$ of the first set of DC voltage sources is decreased to increase the amount of charging energy of the low-voltage DC bus capacitor; and/or the output voltage $U_{d2}$ of the second set of DC voltage sources is decreased to decrease the amount of discharging energy of the low-voltage DC bus capacitor.

In some embodiments of the present disclosure, the DC voltage source may be a battery cluster or a photovoltaic string. In an implementation, when the DC voltage source is the battery cluster, the current-sharing system can be implemented as a balanced energy storage system.

Figure 16:
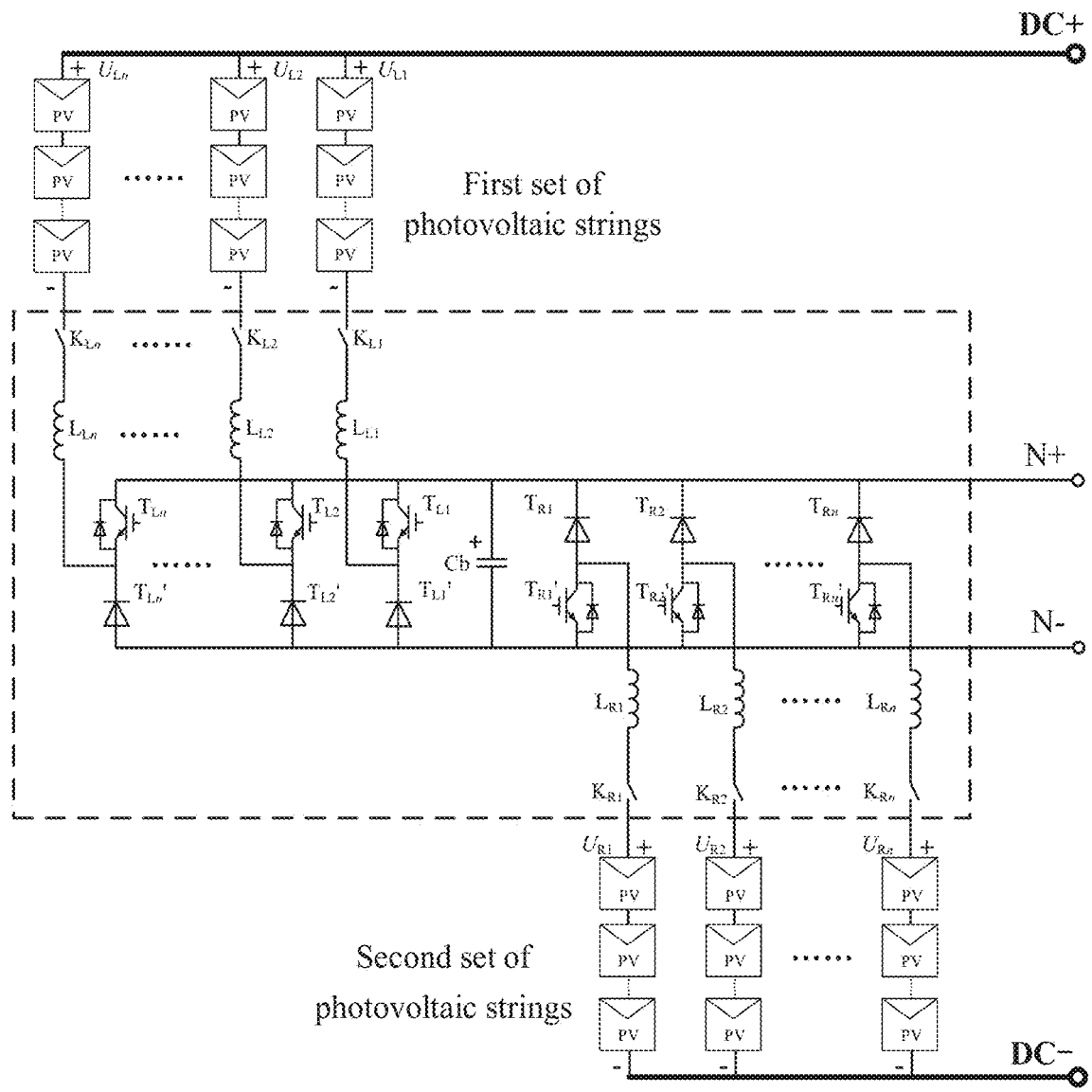
FIG. 16 is a schematic diagram of a photovoltaic power generation system of an embodiment of the disclosure.

In an embodiment, the disclosure can also be used for parallel connection of photovoltaic strings. Since photovoltaic power generation requires only unidirectional output power, the lower switch of the first set of power electronics half-bridge units and the upper switch of the second set of power electronics half-bridge units can be simplified as diodes as shown in FIG. 16.

The control method for the current-sharing system according to the embodiment of the disclosure avoids the problem of uneven current brought about by the direct parallel connection of DC voltage sources, reduces the power and cost of the DC/DC converter, eliminates the need for external power supply, and realizes the effective control of the output current of each DC voltage source branch circuits.

In the description of the specification, the descriptions of the terms "an embodiment", "some embodiments", "examples", "specific examples", and "some examples" mean that the specific features, structures, materials, or characteristics described in combination with the embodiments or examples are included in at least one embodiment or example of the disclosure. In this specification, schematic representations of the above terms need not be directed to the same embodiments or examples. Moreover, the specific features, structures, materials, or characteristics described may be combined in a suitable manner in any one or more of the embodiments or examples. Furthermore, without contradicting each other, those skilled in the art may integrate and combine different embodiments or examples and characteristics of different embodiments or examples described in this specification.

Furthermore, the terms "first" and "second" are used for descriptive purposes only and are not to be understood as indicating or implying relative importance or implicitly specifying the number of technical features indicated. Thus, a feature defined with the term "first" or "second" may explicitly or implicitly include at least one such feature. In the description of the disclosure, the term "a plurality of" means at least two, e.g., two, three, etc., unless otherwise expressly and specifically defined.

What is claimed is:

1. A circuit for controlling a current of a direct current (DC) voltage source, comprising:
   a low-voltage DC bus capacitor, a first set of power electronics half-bridge units, a first set of branch circuit inductors, and a first set of DC switches;
   wherein all of the first set of power electronics half-bridge units are connected in parallel between a positive pole and a negative pole of a low-voltage DC bus and are also connected in parallel with the low-voltage DC bus capacitor, an output neutral point of each power electronics half-bridge unit is connected in series with one of the first set of branch circuit inductors and one of the first set of DC switches to form one of a first set of current-sharing branch circuits, and each power electronics half-bridge unit and the corresponding current-sharing branch circuit are used to be connected with a DC voltage source to form a DC voltage source branch circuit.

2. The circuit of claim 1, further comprising a first set of DC voltage sources and a low-voltage DC power supply;
   wherein output ends of the low-voltage DC power supply are connected in parallel with the low-voltage DC bus capacitor;
   same poles of the first set of DC voltage sources are connected to respective current-sharing branch circuits of the first set of current-sharing branch circuits, another poles of the first set of DC voltage sources are coupled together as an output end of a medium-voltage DC bus, and one pole of the low-voltage DC bus is used as the other output end of the medium-voltage DC bus, wherein the medium-voltage DC bus is used to supply power to a load.

3. The circuit of claim 2, wherein according to positive poles or negative poles of the first set of DC voltage sources being connected to the corresponding current-sharing branch circuits, and the positive pole or negative pole of the medium-voltage DC bus being used as an output end of the medium-voltage DC bus, different circuit connections are formed.

4. The circuit of claim 3, wherein
   the positive poles of the first set of DC voltage sources are connected to the respective current-sharing branch circuits, the negative poles of the first set of the DC voltage sources are coupled together as a negative pole of the medium-voltage DC bus, and the positive pole of the low-voltage DC bus is used as a positive pole of the medium-voltage DC bus, to form a first circuit connection; or
   the positive poles of the first set of DC voltage sources are connected to the respective current-sharing branch circuits, the negative poles of the first set of the DC voltage sources are coupled together as a negative pole of the medium-voltage DC bus, and the negative pole of the low-voltage DC bus is used as a positive pole of the medium-voltage DC bus, to form a second circuit connection; or
   the negative poles of the first set of DC voltage sources are connected to the respective current-sharing branch circuits, the positive poles of the first set of DC voltage sources are coupled together as a positive pole of the medium-voltage DC bus, and the negative pole of the low-voltage DC bus is used as the negative pole of the medium-voltage DC bus, to form a third circuit connection; or
   the negative poles of the first set of DC voltage sources are connected to the respective current-sharing branch circuits, the positive poles of the first set of DC voltage sources are coupled together as a positive pole of the medium-voltage DC bus, and the positive pole of the low-voltage DC bus is used as the negative pole of the medium-voltage DC bus, to form a fourth circuit connection.

5. The circuit of claim 4, wherein assuming that voltages of the first set of DC voltage sources are $U_1, U_2, \ldots, U_n$, respectively, where a maximum voltage is $U_{max}$ and a minimum voltage is $U_{min}$, a voltage of the low-voltage DC bus is $U_b$, and a voltage of the medium-voltage DC bus is $U_d$;
   the first set of power electronics half-bridge units operate in a complementary state, and a switching function of an upper switch $T_j$ of each power electronics half-bridge unit is defined as $S_j$, $j=1, 2, \ldots, n$; and
   when the upper switch is on and a lower switch is off, $S_j=1$, and when the upper switch is off and the lower switch is on, $S_j=0$.

6. The circuit of claim 5, wherein,
   according to the first circuit connection and by taking a direction in which the current flowing out of the half-bridge unit as a positive direction, an inductor voltage on a $j^{th}$ branch circuit is:

$$u_{Lj} = U_d - U_j - (1 - S_j)U_b; \quad (1)$$

in a case that the half-bridge unit operates in a pulse-width modulation (PWM) chopper mode, if Eq. (1) satisfies that $u_{Lj}>0$ when $S_j=1$ to increase an inductor current and $u_{Lj}<0$ when $S_j=0$ to decrease the inductor current, to make an average value of the inductor current controllable, an output voltage of the medium-voltage DC bus satisfies Eq. (2):

$$U_{max} < U_d < U_b + U_{min}; \quad (2)$$

on the basis of an increased amount and a decreased amount of inductor current within one switching cycle at steady state being identical, and according to Eq. (1), it is obtained:

$$\frac{U_d - U_j}{L_j} \cdot T_{on} = -\frac{U_d - U_j - U_b}{L_j} \cdot T_{off}; \qquad (3)$$

where $T_{on}$ and $T_{off}$ represent an on time and an off time of the upper switch $T_j$ of the half-bridge unit within one switching cycle, respectively, and Lj represents a branch circuit inductor, a duty cycle $d_j$ of the switching function $S_j$ within one switching cycle at steady state is:

$$d_j = \frac{T_{on}}{T_{on} + T_{off}} = (U_j + U_b - U_d)/U_b; \qquad (4)$$

or,
according to the second circuit connection, an inductor voltage on a $j^{th}$ branch circuit is:

$$u_{Lj} = U_d - U_j + S_j \cdot U_b; \qquad (5)$$

an output voltage of the medium-voltage DC bus satisfies:

$$U_{max} - U_b < U_d < U_{min}; \qquad (6)$$

a duty cycle $d_j$ of the switching function $S_j$ within one switching cycle at steady state is:

$$d_j = (U_j - U_d)/U_b; \qquad (7)$$

or,
according to the third circuit connection, an inductor voltage on a $j^{th}$ branch circuit is:

$$u_{Lj} = U_j + S_j \cdot U_b - U_d; \qquad (8)$$

an output voltage of the medium-voltage DC bus satisfies:

$$U_{max} < U_d < U_b + U_{min}; \qquad (9)$$

a duty cycle $d_j$ of the switching function $S_j$ within one switching cycle at steady state is:

$$d_j = (U_d - U_j)/U_b; \qquad (10)$$

or,
according to the fourth circuit connection, an inductor voltage on a $j^{th}$ branch circuit is:

$$u_{Lj} = U_j - (1 - S_j) \cdot U_b - U_d; \qquad (11)$$

an output voltage of the medium-voltage DC bus satisfies:

$$U_{max} - U_b < U_d < U_{min}; \qquad (12)$$

a duty cycle $d_j$ of the switching function $S_j$ within one switching cycle at steady state is:

$$d_j = (U_d + U_b - U_j)/U_b. \qquad (13)$$

7. The circuit of claim 2, wherein when a DC voltage source is a photovoltaic string that requires unidirectional power output, one of two fully controlled switching components of a corresponding power electronics half-bridge unit is replaced by a diode.

8. The circuit of claim 7, wherein when a positive pole of the photovoltaic string is connected to a current-sharing branch circuit, an upper switch of the power electronics half-bridge unit is replaced by a diode; and when a negative pole of the photovoltaic string is connected to a current-sharing branch circuit, the lower switch of the power electronics half-bridge unit is replaced by a diode.

9. The circuit of claim 2, wherein the low-voltage DC power supply is an isolated alternating current (AC)/DC converter using AC power supply or an isolated DC/DC converter using DC power supply.

10. The circuit of claim 1, further comprising a first set of DC voltage sources, a second set of DC voltage sources, a second set of power electronics half-bridge units, a second set of branch circuit inductors and a second set of DC switches;

wherein all of the second set of power electronics half-bridge units are connected in parallel between the positive pole and negative pole of the low-voltage DC bus and are also connected in parallel with the low-voltage DC bus capacitor; an output neutral point of each of the second set of power electronics half-bridge units is connected in series with one of the second set of branch inductors and one of the second set of DC switches to form one of a second set of current-sharing branch circuits;

negative poles of the first set of DC voltage sources are connected to the first set of current-sharing branch circuits respectively, and positive poles of the first set of DC voltage sources are coupled together to form a positive pole of a medium-voltage DC bus;

positive poles of the second set of DC voltage sources are connected to the second set of current-sharing branch circuits respectively, and negative poles of the second set of DC voltage sources are coupled together to form a negative pole of the medium-voltage DC bus.

11. The circuit of claim 10, wherein a power electronics half-bridge unit comprises two switching components connected in series, and an emitter of an upper switch is connected to a collector of a lower switch and together serves as a neutral point of the power electronics half-bridge unit.

12. The circuit of claim 11, wherein collectors of upper switches of all the power electronics half-bridge units are connected to a positive pole of the low-voltage DC bus capacitor to form the positive pole of the low-voltage DC bus, and emitters of lower switches of all the power electronics half-bridge units are connected to a negative pole of the low-voltage DC bus capacitor to form the negative pole of the low-voltage DC bus.

13. The circuit of claim 12, wherein the positive pole or the negative pole of the low-voltage DC bus is used as a neutral point of the medium-voltage DC bus.

14. The circuit of claim 13, wherein a grid-connected inverter is connected between the positive pole of the medium-voltage DC bus and the neutral point of the medium-voltage DC bus, another grid-connected inverter is connected between the neutral point of the medium-voltage DC bus and the negative pole of the medium-voltage DC bus, and the two inverters are connected to a grid through a double-split transformer, to form a fifth circuit connection; or a grid-connected inverter with a DC bus neutral point and outputting the neutral point is connected between the positive pole of the medium-voltage DC bus, the neutral point of the medium-voltage DC bus, and the negative pole of the medium-voltage DC bus, and then connected to the grid through a step-up transformer, to form a sixth circuit connection; or a grid-connected inverter is connected between the positive pole and negative pole of the medium-voltage DC bus without connecting to the neutral point, and is connected to the grid through a step-up transformer, to form a seventh circuit connection.

15. The circuit of claim 14, wherein assuming that a maximum voltage in the first set of n DC voltage sources is $U_{Lmax}$ and a minimum voltage is $U_{Lmin}$, a maximum voltage in the second set of n DC voltage sources is $U_{Rmax}$ and a minimum voltage is $U_{Rmin}$, and a voltage of the low-voltage DC bus is $U_b$, when adopting the fifth circuit connection or the sixth circuit connection,
if the neutral point of the medium-voltage DC bus is the positive pole of the low-voltage DC bus, an output voltage $U_{d1}$ of the first set of DC voltage sources connected in parallel satisfies:

$$U_{Lmax} - U_b < U_{d1} < U_{Lmin}; \quad (14)$$

an output voltage $U_{d2}$ of the second set of DC voltage sources connected in parallel satisfies:

$$U_{Rmax} < U_{d2} < U_b + U_{Rmin}; \quad (15)$$

or
if the neutral point of the medium-voltage DC bus is the negative pole of the low-voltage DC bus, an output voltage $U_{d1}$ of the first set of DC voltage sources connected in parallel satisfies:

$$U_{Lmax} < U_{d1} < U_b + U_{Lmin}; \quad (16)$$

an output voltage $U_{d2}$ of the second set of DC voltage sources connected in parallel satisfies:

$$U_{Rmax} - U_b < U_{d2} < U_{Rmin}; \quad (17)$$

when adopting the seventh circuit connection,
an output voltage $U_d$ of the medium-voltage DC bus after connecting the first set of DC voltage sources and the second set of DC voltage sources in series satisfies:

$$U_{Lmax} + U_{Rmax} - U_b < U_d < U_{Lmin} + U_{Rmin} + U_b; \quad (18)$$

according to Eqs. (14)-(18), the voltage $U_b$ of the low-voltage DC bus satisfies:

$$\begin{cases} U_b > U_{Lmax} - U_{Lmin} \\ U_b > U_{Rmax} - U_{Rmin} \end{cases}. \quad (19)$$

16. The circuit of claim 1, wherein a switching component of a power electronics half-bridge unit is an insulated gate bipolar transistor (IGBT), metal-oxide-semiconductor field-effect transistor (MOSFET), or a high electron mobility transistor (HEMT).

17. A control method, applied to a circuit for controlling a current of a direct current (DC) voltage source comprising a low-voltage DC bus capacitor, a first set of power electronics half-bridge units, a first set of branch circuit inductors, and a first set of DC switches, all of the first set of power electronics half-bridge units being connected in parallel between a positive pole and a negative pole of a low-voltage DC bus and being also connected in parallel with the low-voltage DC bus capacitor, an output neutral point of each power electronics half-bridge unit being connected in series with one of the first set of branch circuit inductors and one of the first set of DC switches to form one of a first set of current-sharing branch circuits, and each power electronics half-bridge unit and the corresponding current-sharing branch circuit are used to be connected with a DC voltage source to form a DC voltage source branch circuit, the method comprising:

determining whether to disconnect the DC switch of the DC voltage source branch circuit; and
determining a switch control signal of the power electronics half-bridge unit in the DC voltage source branch circuit.

18. The method of claim 17, wherein
the method uses voltage-current double closed-loop control, in a case that the circuit further comprises a first set of DC voltage sources and a low-voltage DC power supply, output ends of the low-voltage DC power supply are connected in parallel with the low-voltage DC bus capacitor, same poles of the first set of DC voltage sources are connected to respective current-sharing branch circuits of the first set of current-sharing branch circuits, another poles of the first set of DC voltage sources are coupled together as an output end of a medium-voltage DC bus, and one pole of the low-voltage DC bus is used as the other output end of the medium-voltage DC bus; and determining whether to disconnect the DC switch of the DC voltage source branch circuit comprises:

obtaining a preset voltage of the medium-voltage DC bus and an output voltage of the low-voltage DC power supply based on equations corresponding to different circuit connections;

determining a permissible operating voltage range of the DC voltage source according to the preset voltage of the medium-voltage DC bus and the output voltage of the low-voltage DC power supply; and obtaining an operating voltage of the DC voltage source, and disconnecting the DC switch of the corresponding DC voltage source branch circuit if the operating voltage of the DC voltage source is out of the predetermined operating voltage range; and determining the switch control signal of the power electronics half-bridge unit in the DC voltage source branch circuit comprises:

performing output voltage closed-loop control for the medium-voltage DC bus, and obtaining a total current reference value of all DC voltage source branch circuits;

assigning a current reference value for each branch circuit according to a voltage level of the DC voltage source on each branch circuit or a control instruction; and performing inductor current closed-loop control for each branch circuit according to the assigned current reference value of each branch circuit, and obtaining the switch control signal of the power electronics half-bridge unit in each branch circuit.

19. The method of claim 17, wherein the method uses voltage-current double closed-loop control, in a case that the circuit further comprises a first set of DC voltage sources, a second set of DC voltage sources, a second set of power electronics half-bridge units, a second set of branch circuit inductors and a second set of DC switches, and all of the second set of power electronics half-bridge units are connected in parallel between the positive pole and negative pole of the low-voltage DC bus and are also connected in parallel with the low-voltage DC bus capacitor;

an output neutral point of each of the second set of power electronics half-bridge units is connected in series with one of the second set of branch inductors and one of the second set of DC switches to form one of a second set of current-sharing branch circuits;

negative poles of the first set of DC voltage sources are connected to the first set of current-sharing branch circuits respectively, and positive poles of the first set of DC voltage sources are coupled together to form a positive pole of a medium-voltage DC bus;

positive poles of the second set of DC voltage sources are connected to the second set of current-sharing branch circuits respectively, and negative poles of the second set of DC voltage sources are coupled together to form a negative pole of the medium-voltage DC bus;

determining whether to disconnect the DC switch of the DC voltage source branch circuit comprises:

obtaining operating voltages of all DC voltage sources, and obtaining output voltages of the two sets of DC voltage sources and a preset voltage value of the low-voltage DC bus according to different equations corresponding to different circuit connections; determining a permissible operating voltage range of the DC voltage source, and disconnecting the DC switch of the corresponding DC voltage source branch circuit if the operating voltage of the DC voltage source is out of the predetermined operating voltage range; and determining the switch control signal of the power electronics half-bridge unit in the DC voltage source branch circuit comprises:

performing voltage closed-loop control for the low-voltage DC bus according to the preset voltage value of the low-voltage DC bus, and adjusting the output voltages of the two sets of DC voltage sources or the preset voltage value of the medium-voltage DC bus;

performing output voltage closed-loop control for the two sets of DC voltage sources and obtaining a total current reference value of all branch circuits, according the adjusted output voltages of the two sets of DC voltage sources;

assigning a current reference value for each branch circuit according to a voltage or a size of SOC of the DC voltage source on the branch circuit; and performing inductor current closed-loop control for each branch circuit according to the assigned current reference value of the branch circuit, and obtaining the switch control signal of the power electronics half-bridge unit in each branch circuit.

20. The method of claim 19, wherein performing voltage closed-loop control for the low-voltage DC bus, comprises:

when adopting a fifth circuit connection or a sixth circuit connection, and using a positive pole of the low-voltage DC bus as a neutral point of the medium-voltage DC bus, and in a case that the circuit is used for discharging, if a voltage of the low-voltage DC bus is greater than a rated value, performing at least one of:
increasing an output voltage of the first set of DC voltage sources to reduce an amount of charging energy of a low-voltage DC bus capacitor; or
increasing an output voltage of the second set of DC voltage sources to increase an amount of discharging energy of the low-voltage DC bus capacitor; and if the voltage of the low-voltage DC bus is less than the rated value, performing at least one of:
decreasing the output voltage of the first set of DC voltage sources to increase the amount of charging energy of the low-voltage DC bus capacitor; or
decreasing the output voltage of the second set of DC voltage sources to decrease the amount of discharging energy of the low-voltage DC bus capacitor.

* * * * *